(12) United States Patent
Yu et al.

(10) Patent No.: US 11,892,802 B2
(45) Date of Patent: Feb. 6, 2024

(54) LENSLESS HOLOGRAPHIC IMAGING SYSTEM USING HOLOGRAPHIC OPTICAL ELEMENT

(71) Applicant: NATIONAL CENTRAL UNIVERSITY, Taoyuan (TW)

(72) Inventors: Yeh-Wei Yu, Taoyuan (TW); Ching-Cherng Sun, Taoyuan (TW)

(73) Assignee: NATIONAL CENTRAL UNIVERSITY, Taoyuan (TW)

(*) Notice: Subject to any disclaimer, the term of this patent is extended or adjusted under 35 U.S.C. 154(b) by 124 days.

(21) Appl. No.: 17/078,321

(22) Filed: Oct. 23, 2020

(65) Prior Publication Data
US 2021/0294265 A1 Sep. 23, 2021

Related U.S. Application Data
(60) Provisional application No. 62/991,211, filed on Mar. 18, 2020.

(51) Int. Cl.
*G03H 1/04* (2006.01)
*G03H 1/16* (2006.01)

(52) U.S. Cl.
CPC .......... *G03H 1/0443* (2013.01); *G03H 1/16* (2013.01); *G03H 2001/0447* (2013.01); *G03H 2001/0452* (2013.01); *G03H 2222/34* (2013.01); *G03H 2222/45* (2013.01); *G03H 2223/23* (2013.01); *G03H 2223/24* (2013.01); *G03H 2225/52* (2013.01)

(58) Field of Classification Search
CPC .......... G03H 1/0443; G03H 1/16; G03H 2001/0477; G03H 2001/0452; G03H 2222/34; G03H 2222/45; G03H 2223/23; G03H 2223/24; G03H 2225/52; G03H 2001/045; G03H 2001/0033; G03H 1/0465
USPC ............ 348/40; 356/450, 457; 359/15
See application file for complete search history.

(56) References Cited

U.S. PATENT DOCUMENTS

| | | | |
|---|---|---|---|
| 5,717,508 A * | 2/1998 | Stoll | G11C 13/042 369/103 |
| 10,255,688 B2 * | 4/2019 | Perraut | G06T 7/97 |
| 10,921,236 B2 * | 2/2021 | Rottenberg | G03H 1/0465 |
| 2014/0340476 A1 * | 11/2014 | Sun | G03H 1/0443 348/40 |
| 2021/0080743 A1 * | 3/2021 | Lee | G03H 1/16 |

* cited by examiner

*Primary Examiner* — Audrey Y Chang
(74) *Attorney, Agent, or Firm* — Juan Carlos A. Marquez; Marquez IP Law Office, PLLC

(57) ABSTRACT

A lensless holographic imaging system having a holographic optical element includes: a coherent light source for outputting a first light beam and a second light beam, wherein the first light beam irradiates a first inspection plane to form first object-diffracted light; a light modulator for modulating the second light beam into reading light having a specific wavefront; a multiplexed holographic optical element, wherein the first object-diffracted light passes through the multiplexed holographic optical element, and the reading light is input into the multiplexed holographic optical element to generate a diffracted light beam as system reference light; and an image capture device for reading at least one interference signal generated by interference between the first object-diffracted light and the system reference light. The lensless holographic imaging system has a relatively small volume and relatively high diffraction efficiency.

4 Claims, 17 Drawing Sheets

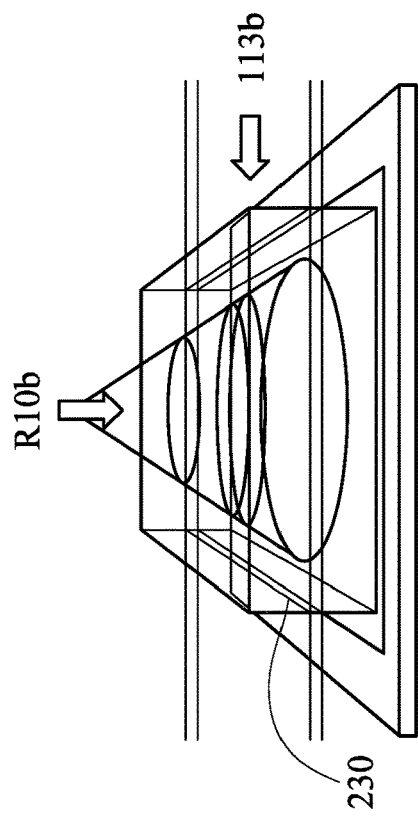
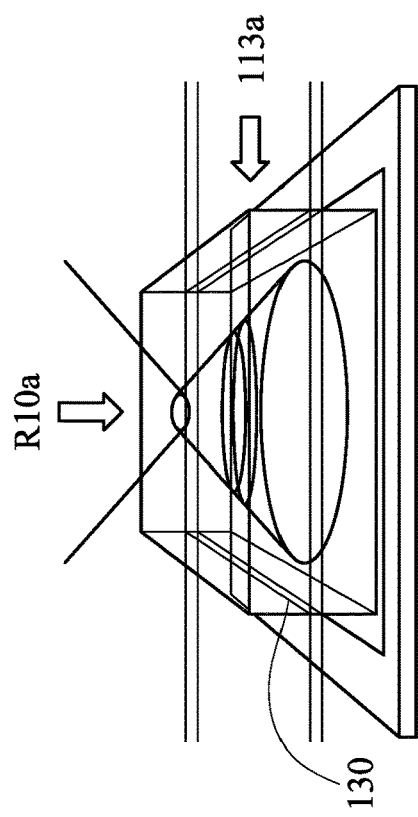
FIG. 5A
FIG. 5B

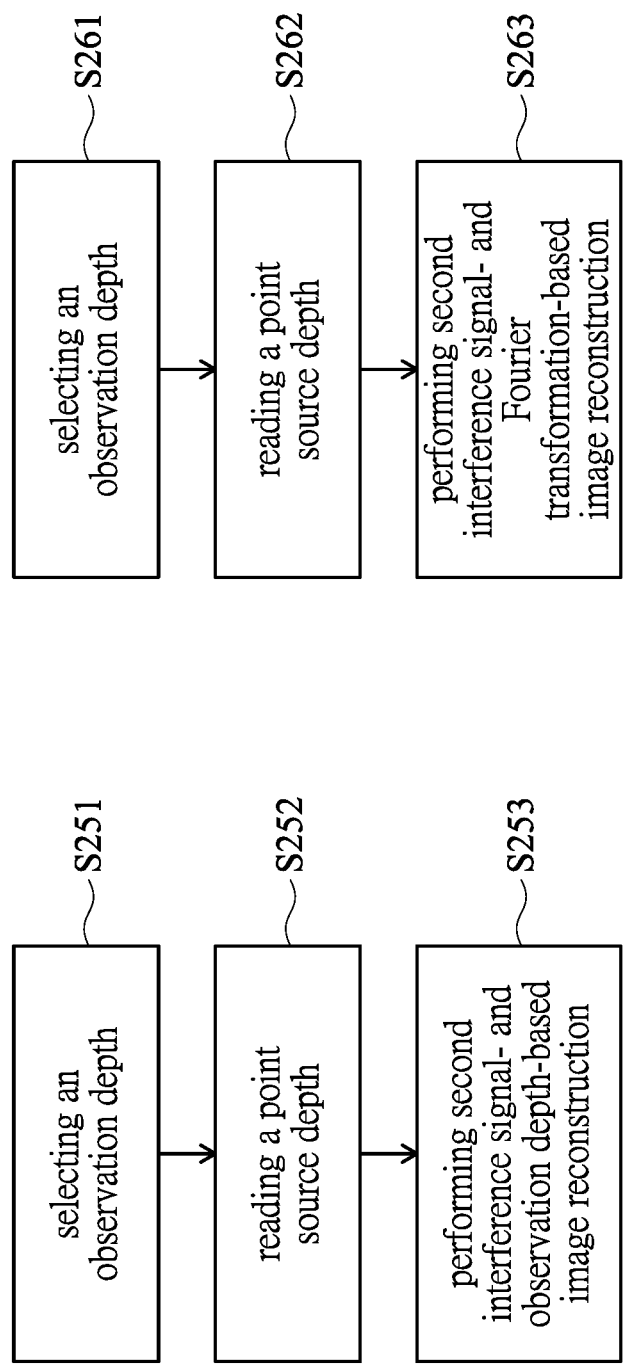

LENSLESS HOLOGRAPHIC IMAGING SYSTEM USING HOLOGRAPHIC OPTICAL ELEMENT

BACKGROUND OF THE INVENTION

1. Technical Field

The present invention relates to a lensless holographic imaging system that uses a holographic optical element. More particularly, the invention relates to a lensless holographic imaging system that uses a holographic optical element and can be employed to inspect specific samples at a short distance.

2. Description of Related Art

FIG. 1 shows an example of using a miniature microscopic digital imaging system P100 on a mobile phone. The imaging system P100 is a conventional digital holographic imaging system using a holographic optical element, as shown in FIG. 2. Basically, a beam splitter P110 and a mirror P120 are used to project a beam of reading light 111 to an object 90 under inspection in order to generate object-diffracted light 911. The object-diffracted light 911 and another beam of reading light 112 are read through another beam splitter P110 to generate an interference signal, and the interference signal is picked up by an imaging device 140 and used for image reconstruction.

To adjust the magnification ratio, referring to FIG. 3, it is common practice to place a lens P130 in the optical path of the object-diffracted light 911. Alternatively, referring to FIG. 4, a lens P130 may be coupled to a displacement device P140 so that the magnification ratio can be adjusted by moving the lens P130 back and forth along the optical path of the reading light 112 through the displacement device P140.

However, the fact that the foregoing depth of field, or focal length, adjusting mechanisms require a large installation space imposes limitations in use or causes inconvenience of use.

BRIEF SUMMARY OF THE INVENTION

The present invention provides a lensless holographic imaging system using a holographic optical element, the primary objective being to overcome such problems of the prior art as the limitations or inconvenience resulting from the bulkiness of the magnification ratio adjusting mechanisms or focal length adjusting mechanisms of the conventional digital holographic imaging systems using a holographic optical element.

The present invention provides a lensless holographic imaging system using a holographic optical element. The lensless holographic imaging system includes a partially coherent light source, a light modulator, a multiplexed holographic optical element, and an image capture device. The partially coherent light source is configured to output a first light beam and a second light beam that are partially coherent with respect to each other. The first light beam is used to irradiate a first inspection plane of an object under inspection, thereby forming first object-diffracted light. The light modulator is configured to receive the second light beam and modulate the second light beam into at least one beam of reading light having a specific wavefront. The first object-diffracted light enters the multiplexed holographic optical element through a first surface thereof, passes through the multiplexed holographic optical element, and exits the multiplexed holographic optical element through a second surface thereof. Also, the at least one beam of reading light is input into the multiplexed holographic optical element to generate at least one diffracted light beam as at least one beam of first system reference light. The image capture device is adjacent to the second surface and is configured to read the at least one first interference signal generated by interference between the first object-diffracted light and the at least one beam of first system reference light.

The present invention further provides a lensless holographic imaging system using a holographic optical element as summarized below. The lensless holographic imaging system includes a partially coherent light source, a light modulator, a multiplexed holographic optical element, and an image capture device. The partially coherent light source is configured to output a second light beam. The light modulator is configured to receive the second light beam and modulate the second light beam into at least one beam of reading light having a specific wavefront. The multiplexed holographic optical element is irradiated with the at least one beam of reading light; as a result, a portion of the at least one beam of reading light undergoes diffraction in the multiplexed holographic optical element and exits the multiplexed holographic optical element as at least one beam of second system reference light, and another portion of the at least one beam of reading light exits the multiplexed holographic optical element through a first surface thereof as second object-irradiating light. The second object-irradiating light is projected to a second inspection plane of an object under inspection and is reflected thereby to form second object-diffracted light. The second object-diffracted light enters the multiplexed holographic optical element through the first surface thereof, passes through the multiplexed holographic optical element, and exits the multiplexed holographic optical element through a second surface thereof. The image capture device is located at the second surface and is configured to read the at least one second interference signal generated by interference between the second object-diffracted light and the at least one beam of second system reference light.

Implementation of the present invention can produce at least the following advantageous effects:
1. The resulting imaging system has a smaller volume and is more compact than its prior art counterparts; and
2. The resulting imaging system allows its image magnification ratio to be changed.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

FIG. 5A shows how pre-use image recording is performed on a multiplexed holographic optical element for use in the present invention;

FIG. 5B shows how pre-use image recording is performed on another multiplexed holographic optical element for use in the invention;

FIG. 7C shows the flowchart of the second observation-depth-based digital image reconstruction process of the second image reconstruction module;

FIG. 7D shows the flowchart of the second Fourier-transformation-based digital image reconstruction process of the second image reconstruction module;

DETAILED DESCRIPTION OF THE INVENTION

Referring to FIGS. 5A and 5B, the first multiplexed holographic optical element 130 and the second multiplexed holographic optical element 230 used in the following embodiments are volume holographic optical elements, and before those embodiments are put to use, the first and second multiplexed holographic optical elements have been set through a recording process in which each optical element is irradiated with at least one beam of recording light R10 (e.g., a first beam of recording light R10a, a second beam of recording light R10b, etc.) and at least one beam of reading light 113a, 113b so as to become a recorded grating, i.e., with a plurality of interference patterns recorded through each of the first multiplexed holographic optical element 130 and the second multiplexed holographic optical element 230.

First Embodiment

Figure 1:
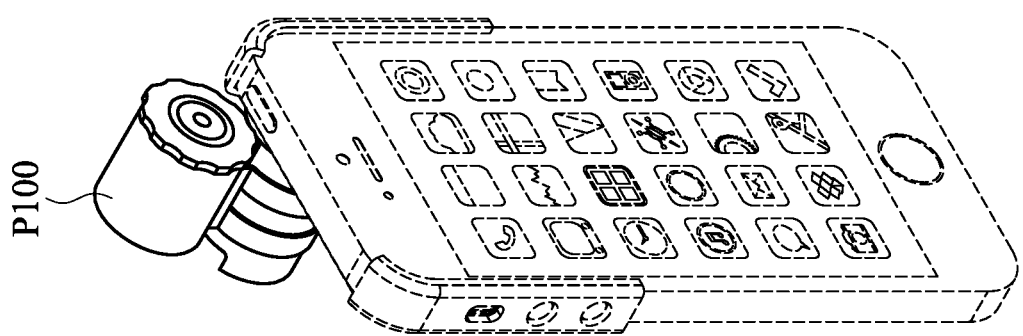
FIG. 1 shows how a conventional miniature microscopic digital imaging system is used on a mobile phone.
Figure 1:
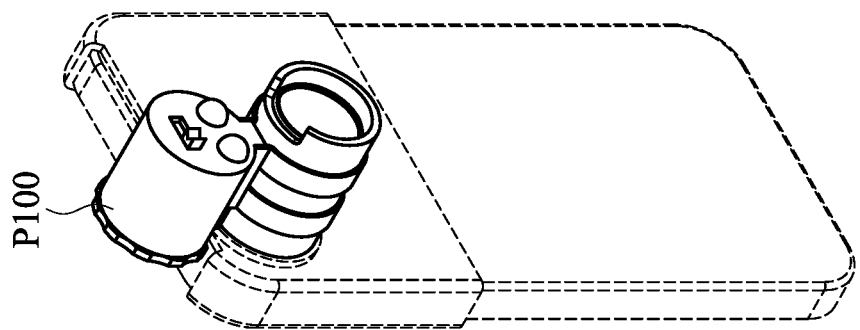
Figure 2:
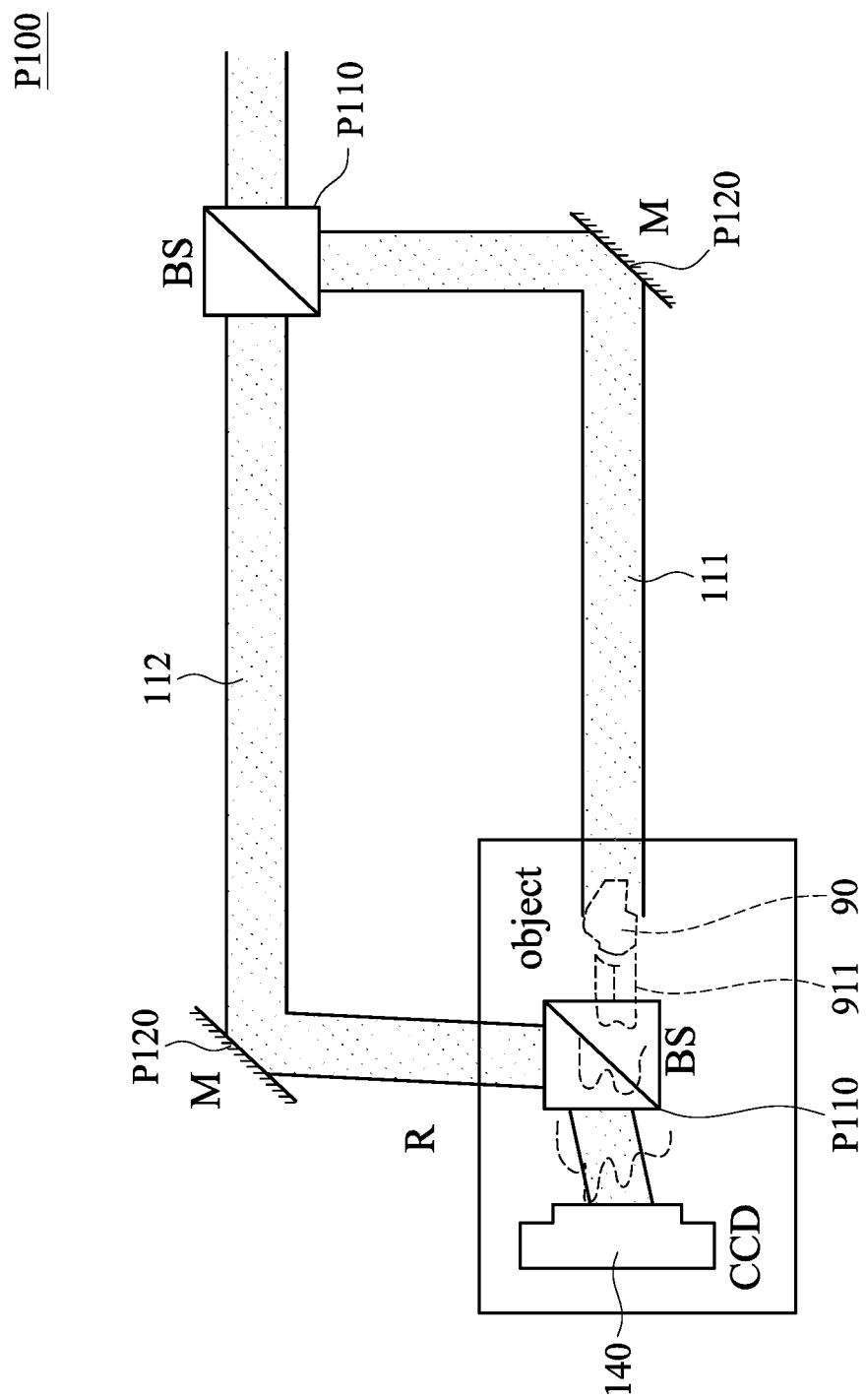
FIG. 2 shows the system structure of a conventional digital holographic imaging system.
Figure 3:
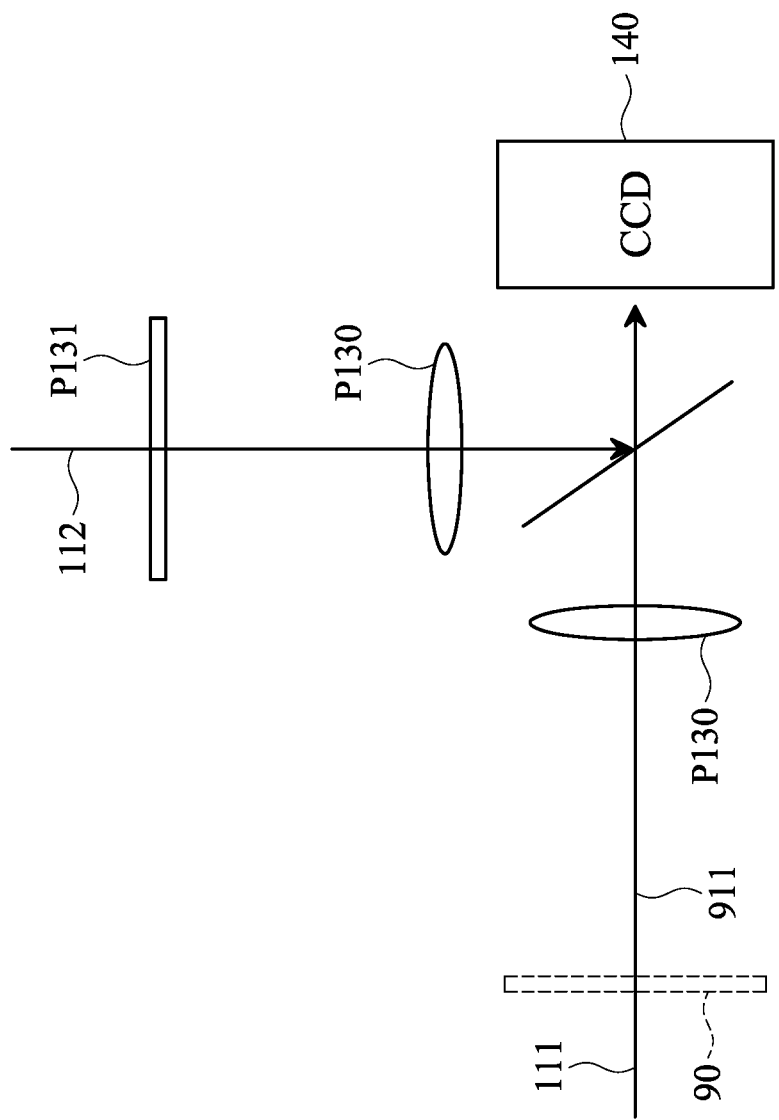
FIG. 3 shows the system structure of a conventional digital holographic imaging system whose magnification ratio can be changed.
Figure 4:
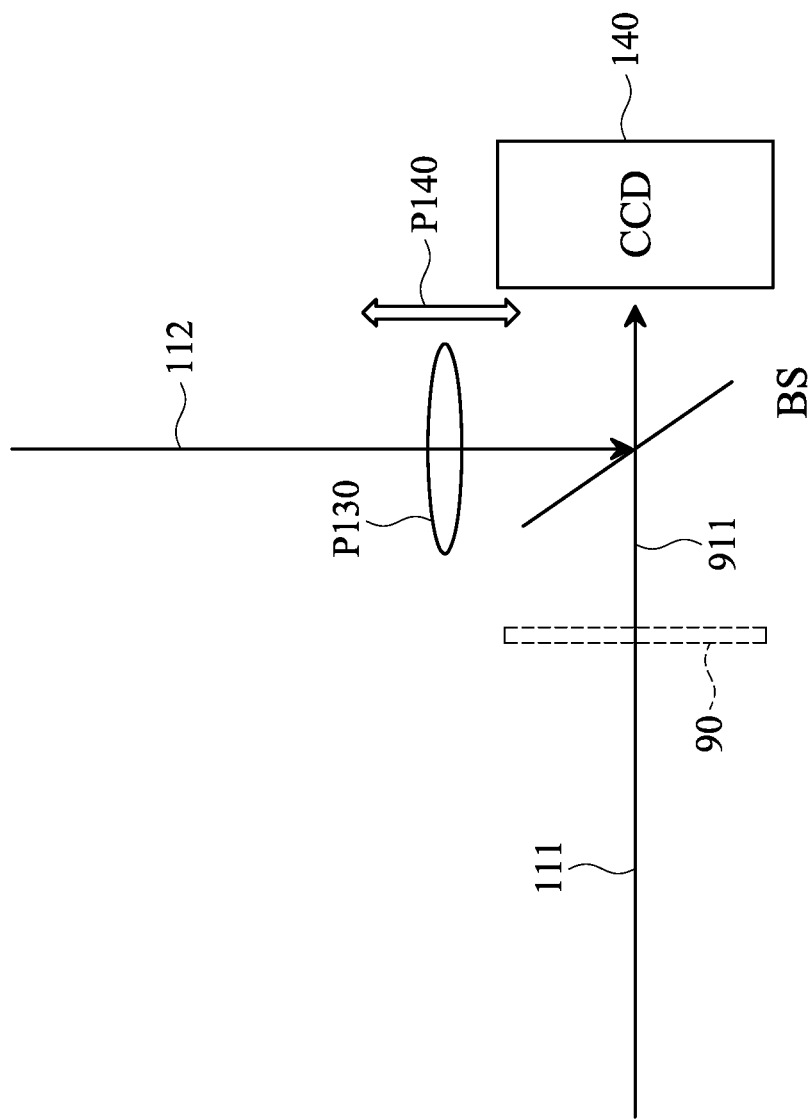
FIG. 4 shows the system structure of another conventional digital holographic imaging system whose magnification ratio can be changed.
Figure 6A:
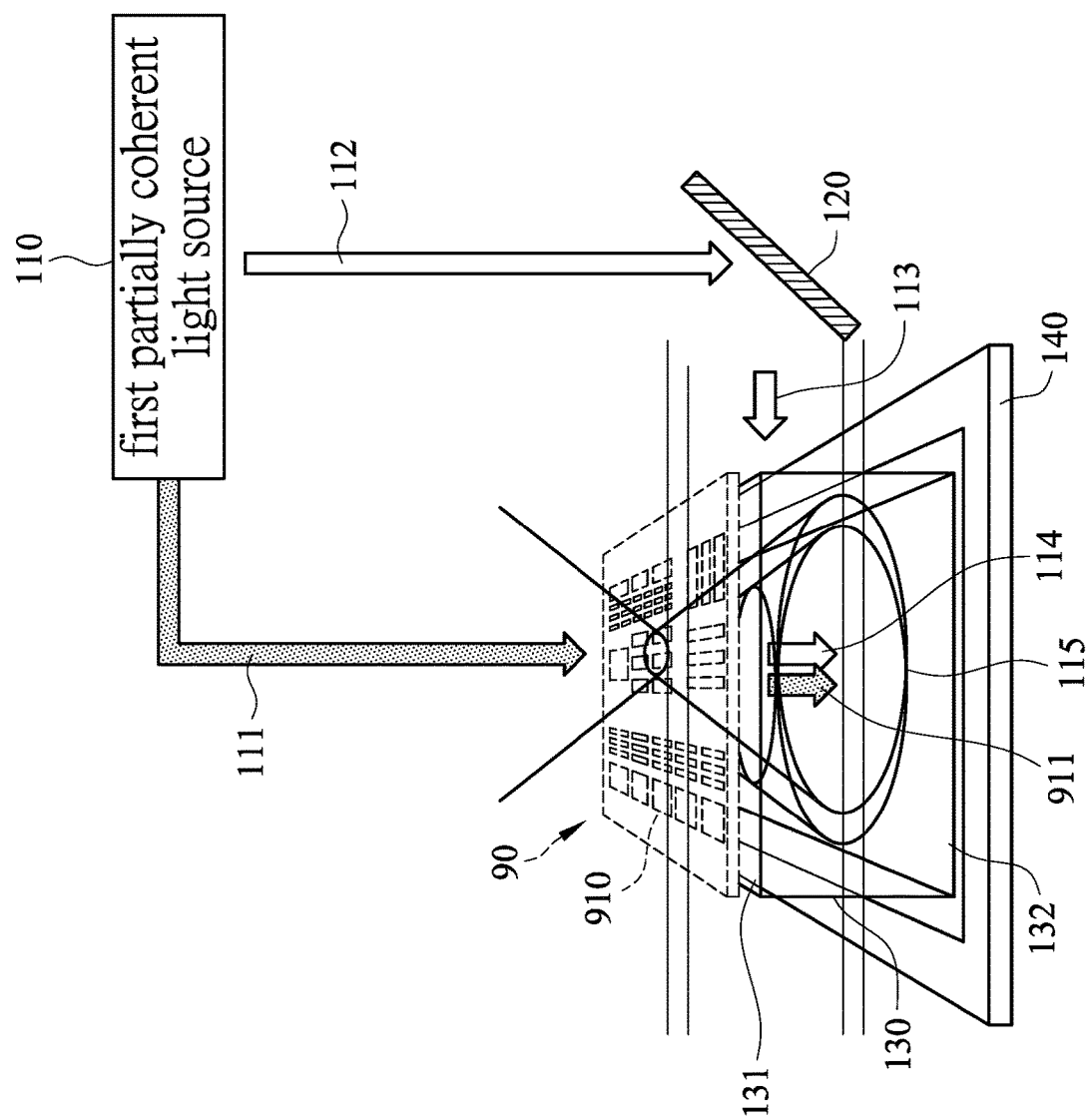
FIG. 6A shows an example of the lensless holographic imaging system according to the first embodiment of the invention.

Referring to FIG. 6A for the first embodiment of the present invention, the lensless holographic imaging system 100 using a holographic optical element includes a first partially coherent light source 110, a light modulator 120, the aforesaid first multiplexed holographic optical element 130, and an image capture device 140.

The first partially coherent light source 110 may be a laser light source for example and is configured to output a first light beam 111 and a second light beam 112 that are partially coherent with respect to each other. The first light beam 111 forms first object-diffracted light 911 after being used to irradiate a first inspection plane 910 of an object 90 under inspection.

The light modulator 120 may be a rotatable mirror for example and is configured to receive the second light beam 112 and modulate the second light beam 112 into at least one beam of reading light 113 that has a specific wavefront. For example, the at least one beam of reading light 113 includes a first beam of reading light and a second beam of reading light, and the first and second beams of reading light are partially coherent with respect to the foregoing first and second beams of recording light respectively.

When this embodiment is put to use, the first object-diffracted light 911 enters the first multiplexed holographic optical element 130 through a first surface 131 thereof, passes through the first multiplexed holographic optical element 130, and exits the first multiplexed holographic optical element 130 through a second surface 132 thereof. Meanwhile, the at least one beam of reading light 113 is input into the first multiplexed holographic optical element 130 and generates at least one diffracted light beam that serves as at least one beam of first system reference light 114.

The image capture device 140 may be a digital camera for example, is located adjacent to the second surface 132 of the first multiplexed holographic optical element 130, and is configured to read, at predetermined time intervals or for a predetermined number of times, the first interference signal 115 generated by interference between the first object-diffracted light 911 and the first system reference light 114.

Figure 6B:
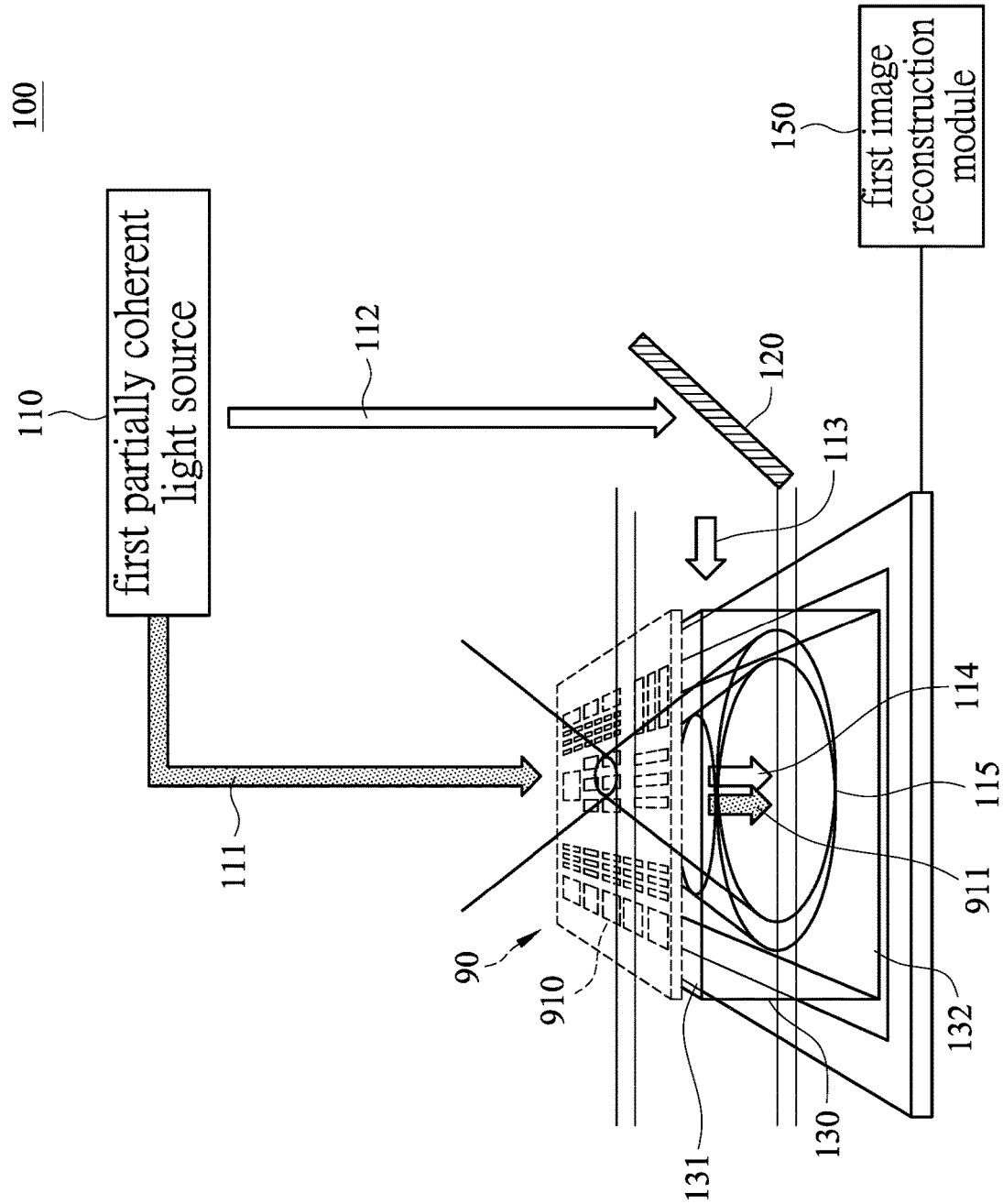
FIG. 6B shows another example of the lensless holographic imaging system according to the first embodiment.
Figures 6C, 6D:
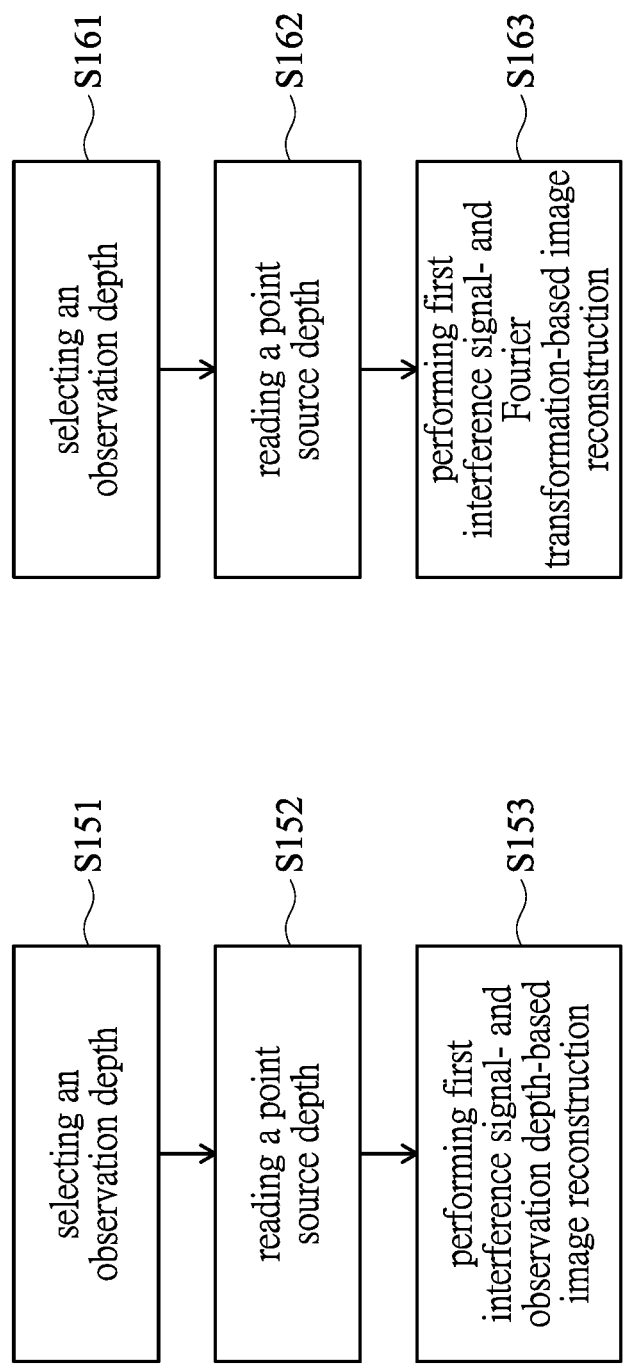
FIG. 6C shows the flowchart of the first observation-depth-based digital image reconstruction process of the first image reconstruction module.
FIG. 6D shows the flowchart of the first Fourier-transformation-based digital image reconstruction process of the first image reconstruction module.

When the first system reference light 114 is a spherical wave originating from a point source, referring to FIG. 6B and FIG. 6C, the lensless holographic imaging system 100 may further have a first image reconstruction module 150 for carrying out a first observation-depth-based digital image reconstruction process that includes the steps of: selecting an observation depth (step S151), reading a point source depth (step S152), and performing first interference-signal- and observation-depth-based image reconstruction (step S153).

In the first step S151 of selecting an observation depth, an observation depth is selected from a plurality of built-in observation depths, wherein each observation depth is the linear distance between the point source of a beam of first system reference light 114 and the inspection plane on a surface of, or inside, an object 90 under inspection. The observation depth of the inspection plane corresponding to each beam of first system reference light 114 can be calculated in advance and recorded in the image reconstruction module.

In the second step S152 of reading a point source depth, the linear distance between the point source of the first system reference light 114 corresponding to the selected observation depth and the image capture device 140 is calculated and read as the point source depth.

In the third step S153 of performing first interference-signal- and observation-depth-based image reconstruction, the first interference signal 115 corresponding to the first system reference light 114 corresponding to the selected observation depth is converted into a first digital interference signal, which corresponds to a first electric field. The first electric field is then propagated to the read point source depth and is filtered at the read point source depth to remove the noise term while leaving the signal-term electric field. The signal-term electric field is subsequently propagated to the selected observation depth to generate a reconstructed image corresponding to the selected observation depth.

Alternatively, referring to FIG. 6D, the first image reconstruction module 150 may carry out a first Fourier-transformation-based digital image reconstruction process whose first and second steps S161 and S162 are the same as the first and second steps S151 and S152 of the first observation-depth-based digital image reconstruction process, but whose third step S163 is different from the third step S153 and involves first interference-signal- and Fourier-transformation-based image reconstruction instead. More specifically, the first interference signal 115 corresponding to the first system reference light 114 corresponding to the selected observation depth is converted into a first digital interference signal, which corresponds to a first electric field. The first electric field is subjected to Fourier transformation and then filtered to remove the noise term while leaving the signal-term electric field. The signal-term electric field is subsequently propagated to the selected observation depth to generate a reconstructed image corresponding to the selected observation depth.

Second Embodiment

Figure 7A:
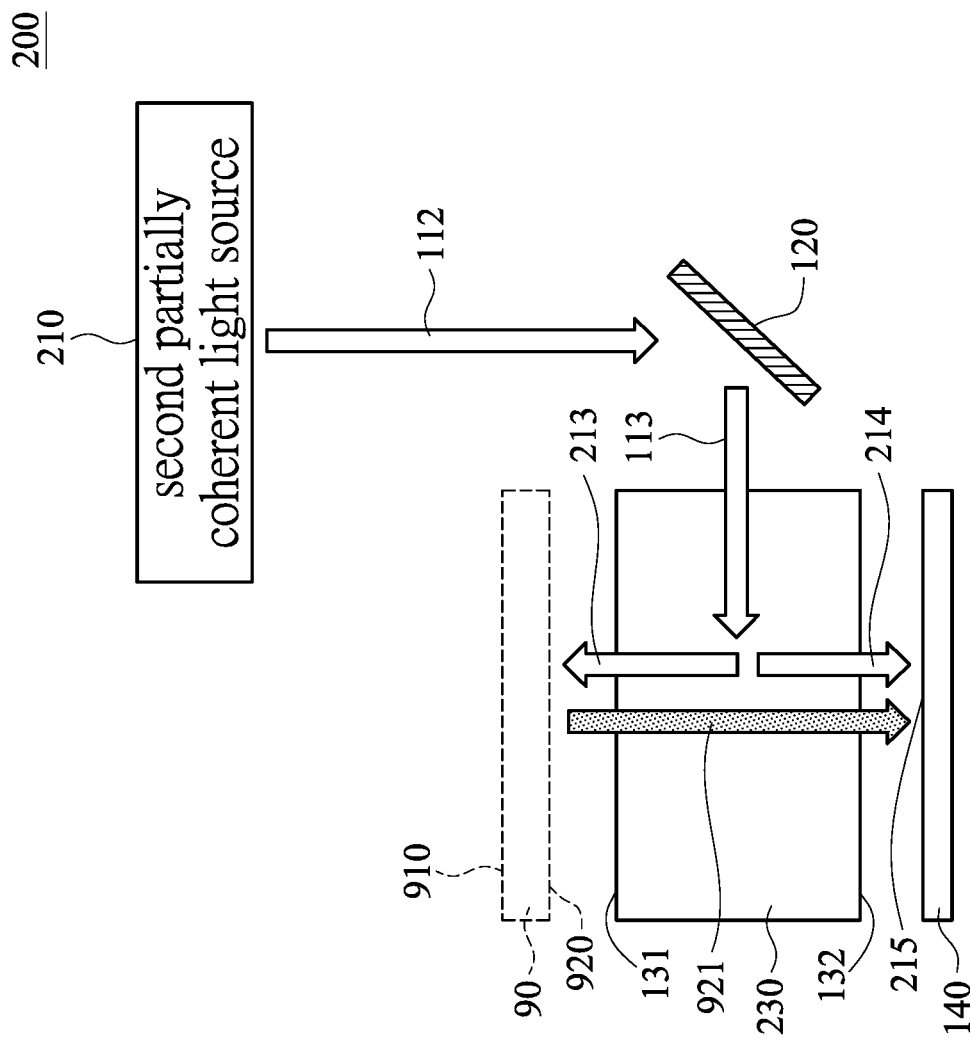
FIG. 7A shows an example of the lensless holographic imaging system according to the second embodiment of the invention.

Referring to FIG. 7A for the second embodiment of the present invention, the lensless holographic imaging system 200 using a holographic optical element includes a second partially coherent light source 210, a light modulator 120, the aforesaid second multiplexed holographic optical element 230, and an image capture device 140.

The second partially coherent light source 210 is configured to output a second light beam 112, such as the light beam output from a laser light source.

The light modulator 120 may be a rotatable mirror for example and is configured to receive the second light beam 112 and modulate the second light beam 112 into at least one beam of reading light 113 that has a specific wavefront. As in the previous embodiment, the at least one beam of reading light 113 may include a first beam of reading light, a second beam of reading light, etc.

When this embodiment is put to use, the second multiplexed holographic optical element 230 is irradiated with at least one beam of reading light 113; as a result, a portion of the at least one beam of reading light 113 undergoes diffraction in the second multiplexed holographic optical element 230 and exits the second multiplexed holographic optical element 230 as at least one beam of second system reference light 214, and another portion of the at least one beam of reading light 113 exits the second multiplexed holographic optical element 230 through a first surface 131 thereof to form second object-irradiating light 213.

The second object-irradiating light 213 is projected to a second inspection plane 920 of an object 90 under inspection and is reflected by the second inspection plane 920 to form second object-diffracted light 921. The second object-diffracted light 921 enters the second multiplexed holographic optical element 230 through the first surface 131, passes through the second multiplexed holographic optical element 230, and exits the second multiplexed holographic optical element 230 through a second surface 132 thereof.

The image capture device 140 may be a digital camera for example, is located at the second surface 132, and is configured to read the at least one second interference signal 215 generated by interference between the second object-diffracted light 921 and the second system reference light 214.

Figure 7B:
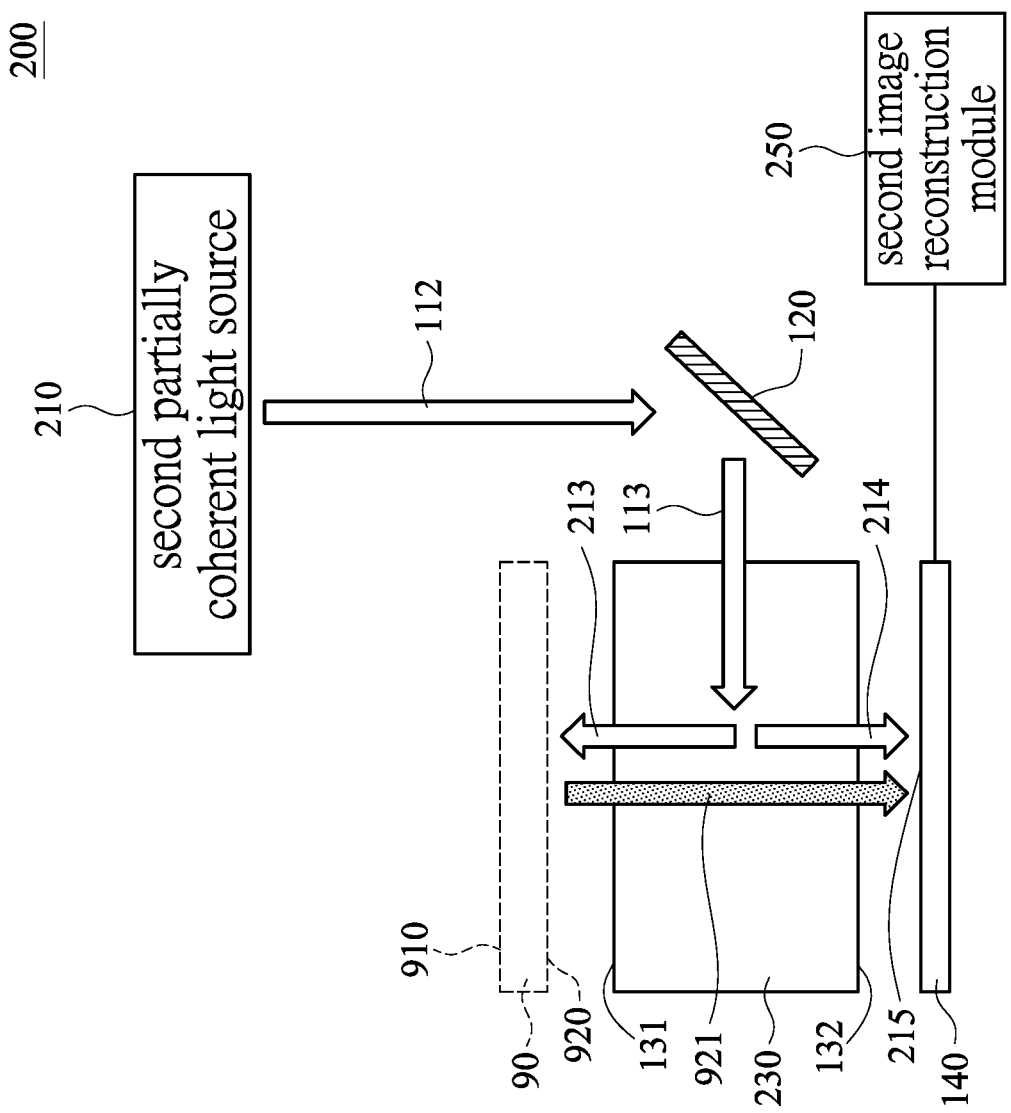
FIG. 7B shows another example of the lensless holographic imaging system according to the second embodiment.

When the second system reference light 214 is a spherical wave originating from a point source, referring to FIG. 7B and FIG. 7C, the lensless holographic imaging system 200 may further have a second image reconstruction module 250 for carrying out a second observation-depth-based digital image reconstruction process that includes the steps of: selecting an observation depth (step S251), reading a point source depth (step S252), and performing second interference-signal- and observation-depth-based image reconstruction (step S253).

In the first step S251 of selecting an observation depth, an observation depth is selected from a plurality of built-in observation depths, wherein each observation depth is the linear distance between the point source of a beam of second system reference light 214 and an inspection plane of an object 90 under inspection. The observation depth of the inspection plane corresponding to each beam of second system reference light 214 can be calculated in advance and recorded in the image reconstruction module.

In the second step S252 of reading a point source depth, the linear distance between the point source of the second system reference light 214 corresponding to the selected observation depth and the image capture device 140 is calculated and read as the point source depth.

In the third step S253 of performing second interference-signal- and observation-depth-based image reconstruction, the second interference signal 215 corresponding to the second system reference light 214 corresponding to the selected observation depth is converted into a second digital interference signal, which corresponds to a second electric field. The second electric field is then propagated to the read point source depth and is filtered at the read point source depth to remove the noise term while leaving the signal-term electric field. The signal-term electric field is subsequently propagated to the selected observation depth to generate a reconstructed image corresponding to the selected observation depth.

Alternatively, referring to FIG. 7D, the second image reconstruction module 250 may carry out a second Fourier-transformation-based digital image reconstruction process whose first and second steps S261 and S262 are the same as the first and second steps S251 and S252 of the second observation-depth-based digital image reconstruction process, but whose third step S263 is different from the third step S253 and involves second interference-signal- and Fourier-transformation-based image reconstruction instead. More specifically, the second interference signal 215 corresponding to the second system reference light 214 corresponding to the selected observation depth is converted into a second digital interference signal, which corresponds to a second electric field. The second electric field is subjected to Fourier transformation and then filtered to remove the noise term while leaving the signal-term electric field. The signal-term electric field is subsequently propagated to the selected observation depth to generate a reconstructed image corresponding to the selected observation depth.

Third Embodiment

Figure 8A:
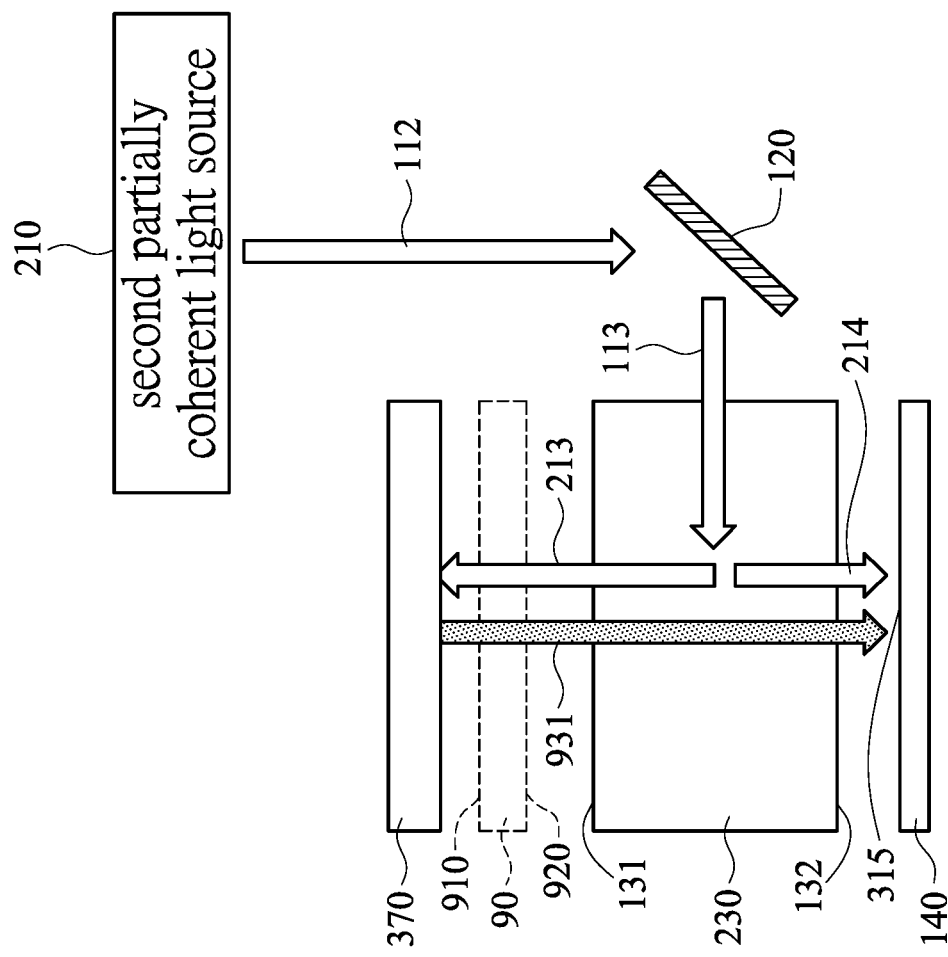
FIG. 8A shows an example of the lensless holographic imaging system according to the third embodiment of the invention.

Referring to FIG. 8A, the third embodiment of the present invention is based on the second embodiment and is further provided with a mirror 370 on the outer side of a first inspection plane 910 of the object 90 under inspection in the second embodiment. The second object-irradiating light 213 passes through the object 90 under inspection and is projected to and reflected by the mirror 370, before passing through the object 90 under inspection again to form third object-diffracted light 931.

The third object-diffracted light 931 enters the second multiplexed holographic optical element 230 through the first surface 131, passes through the second multiplexed holographic optical element 230, and then exits the second multiplexed holographic optical element 230 through the second surface 132, in order for the image capture device 140 to read the at least one third interference signal 315 generated by interference between the third object-diffracted light 931 and the at least one beam of second system reference light 214.

Figure 8B:
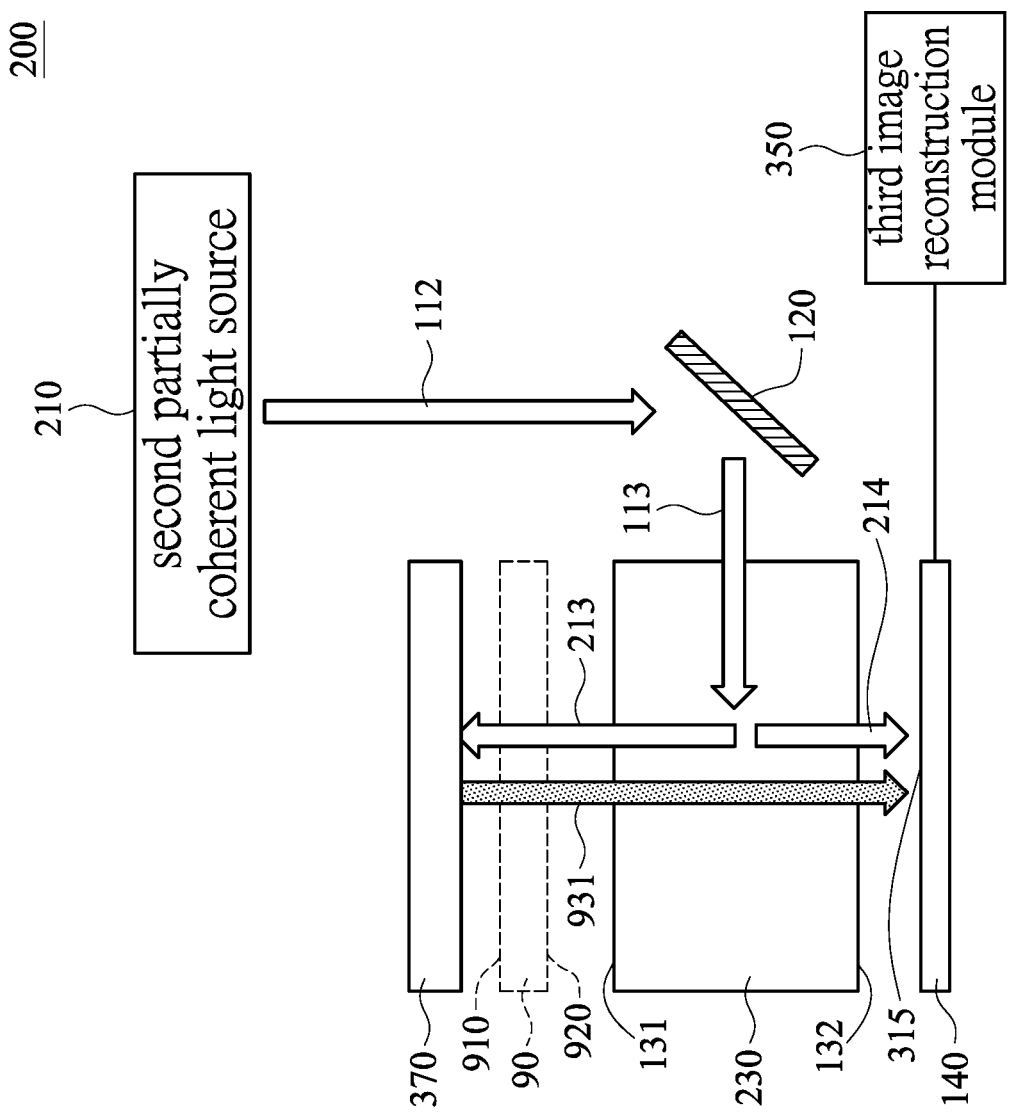
FIG. 8B shows another example of the lensless holographic imaging system according to the third embodiment.
Figures 8C, 8D:
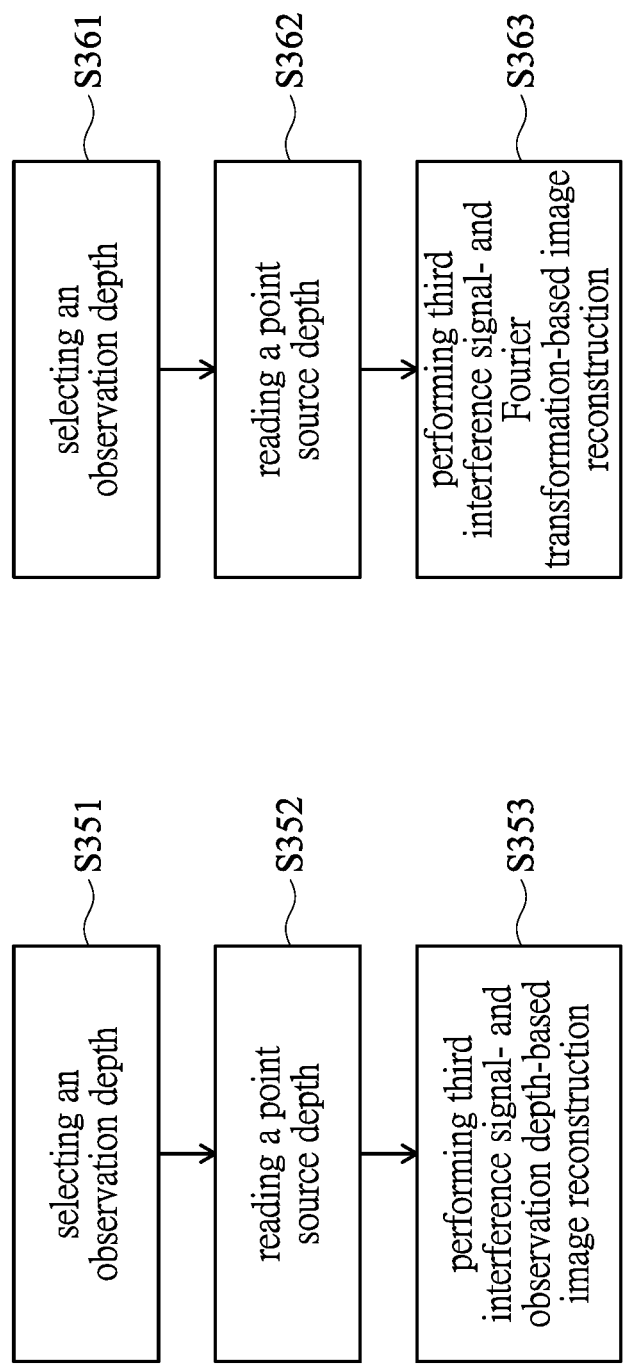
FIG. 8C shows the flowchart of the third observation-depth-based digital image reconstruction process of the third image reconstruction module.
FIG. 8D shows the flowchart of the third Fourier-transformation-based digital image reconstruction process of the third image reconstruction module.

Referring to FIG. 8B and FIG. 8C, the third image reconstruction module 350 in this embodiment may carry out a third observation-depth-based digital image reconstruction process whose third step S353 is modified from the third step S253 of the digital image reconstruction process of the second interference-signal- and observation-depth-based image reconstruction module 250 in the second embodiment, as detailed below.

In the third step S353 of performing third interference-signal- and observation-depth-based image reconstruction, the third interference signal 315 corresponding to the second system reference light 214 corresponding to the selected observation depth is converted into a third digital interference signal, which corresponds to a third electric field. The third electric field is then propagated to the read point source depth and is filtered at the read point source depth to remove the noise term while leaving the signal-term electric field. The signal-term electric field is subsequently propagated to the selected observation depth to generate a reconstructed image corresponding to the selected observation depth.

Alternatively, referring to FIG. 8D, the third image reconstruction module 350 in this embodiment may carry out a third Fourier-transformation-based digital image reconstruction process whose third step S363 of performing third interference-signal- and Fourier-transformation-based image reconstruction is modified from the third step S263 of the second Fourier-transformation-based image reconstruction process in the second embodiment. In the third step S363, the third interference signal 315 corresponding to the second system reference light 214 corresponding to the selected observation depth is converted into a third digital interference signal, which corresponds to a third electric field. The third electric field is subjected to Fourier transformation and then filtered to remove the noise term while leaving the signal-term electric field. The signal-term electric field is subsequently propagated to the selected observation depth to generate a reconstructed image corresponding to the selected observation depth.

Fourth Embodiment

Figure 9A:
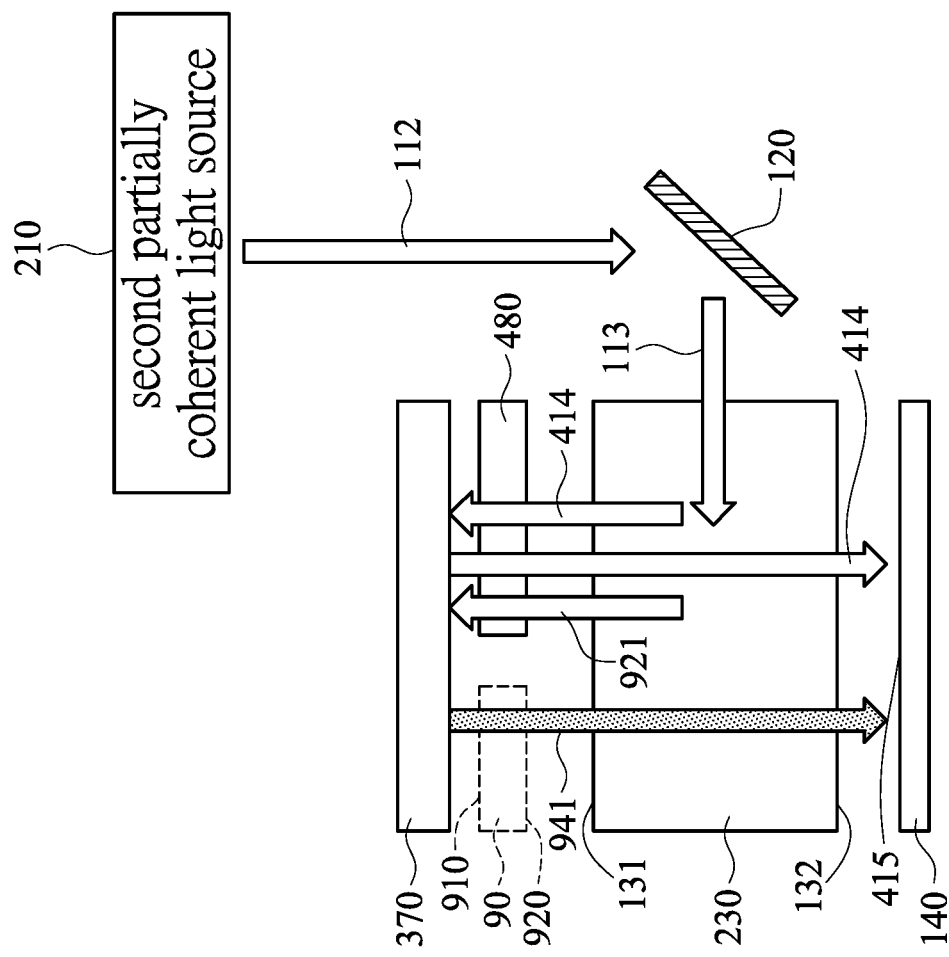
FIG. 9A shows an example of the lensless holographic imaging system according to the fourth embodiment of the invention.
Figure 9B:
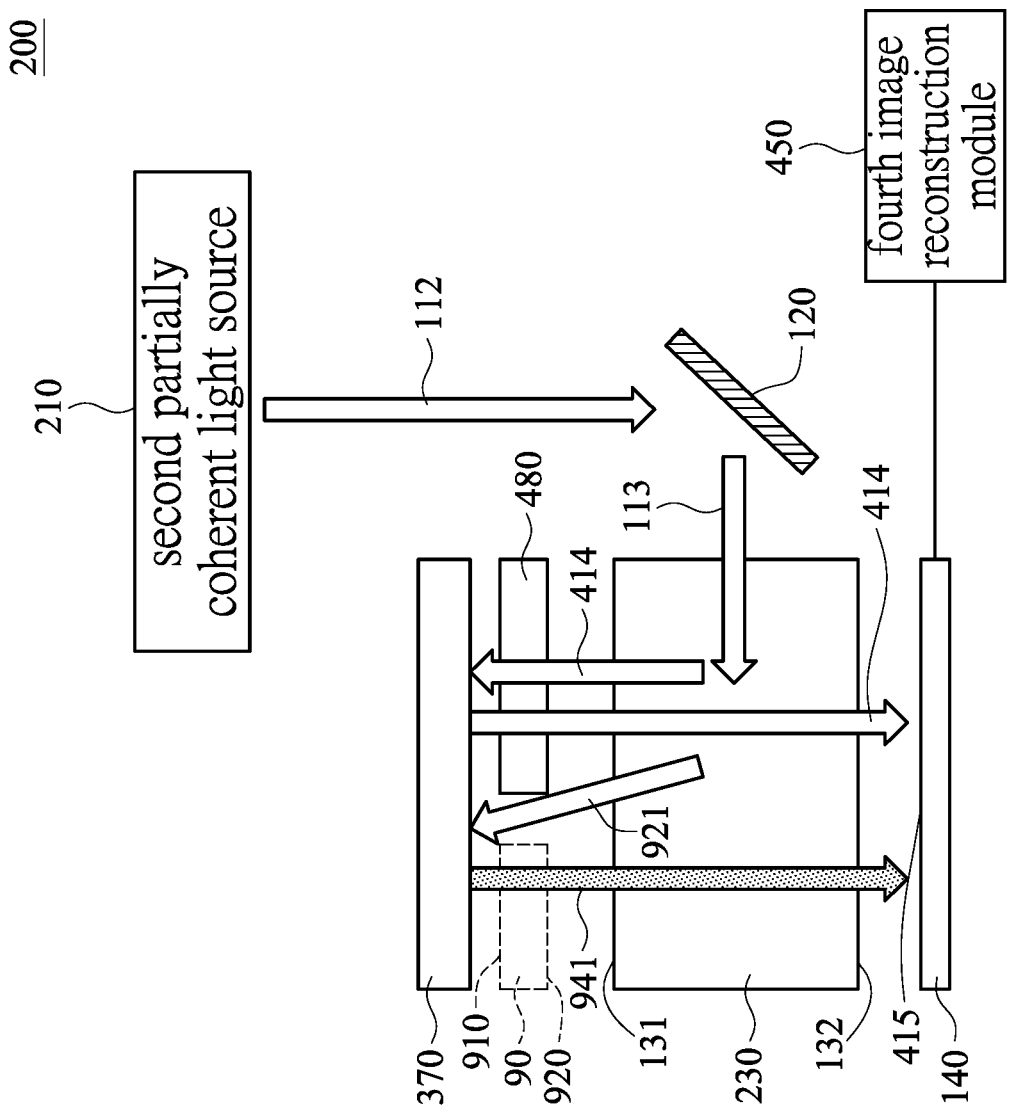
FIG. 9B shows another example of the lensless holographic imaging system according to the fourth embodiment.

Referring to FIG. 9A and FIG. 9B, the fourth embodiment of the present invention is based on the third embodiment and is further provided with a transparent medium layer 480 in a portion of the space between the second multiplexed holographic optical element 230 and the mirror 370.

During use, the second multiplexed holographic optical element 230 is irradiated with the at least one beam of reading light 113 such that a portion of the at least one beam of reading light 113 undergoes diffraction in the second multiplexed holographic optical element 230 and exits the second multiplexed holographic optical element 230 as at least one beam of third system reference light 414. The third system reference light 414 propagates upward through the transparent medium layer 480, is reflected by the mirror 370, passes through the transparent medium layer 480 again, and then passes through the second multiplexed holographic optical element 230.

Meanwhile, another portion of the at least one beam of reading light 113 forms the second object-irradiating light 921. The second object-irradiating light 921 exits the second multiplexed holographic optical element 230 through the first surface 131 and may or may not pass through the transparent medium layer 480 before reaching and being reflected by the mirror 370. The reflected light passes through the object 90 under inspection to form fourth object-diffracted light 941.

The fourth object-diffracted light 941 enters the second multiplexed holographic optical element 230 through the first surface 131, passes through the second multiplexed holographic optical element 230, and then exits the second multiplexed holographic optical element 230 through the second surface 132, in order for the image capture device 140 to read the at least one fourth interference signal 415 generated by interference between the fourth object-diffracted light 941 and the third system reference light 414.

Figures 9C, 9D:
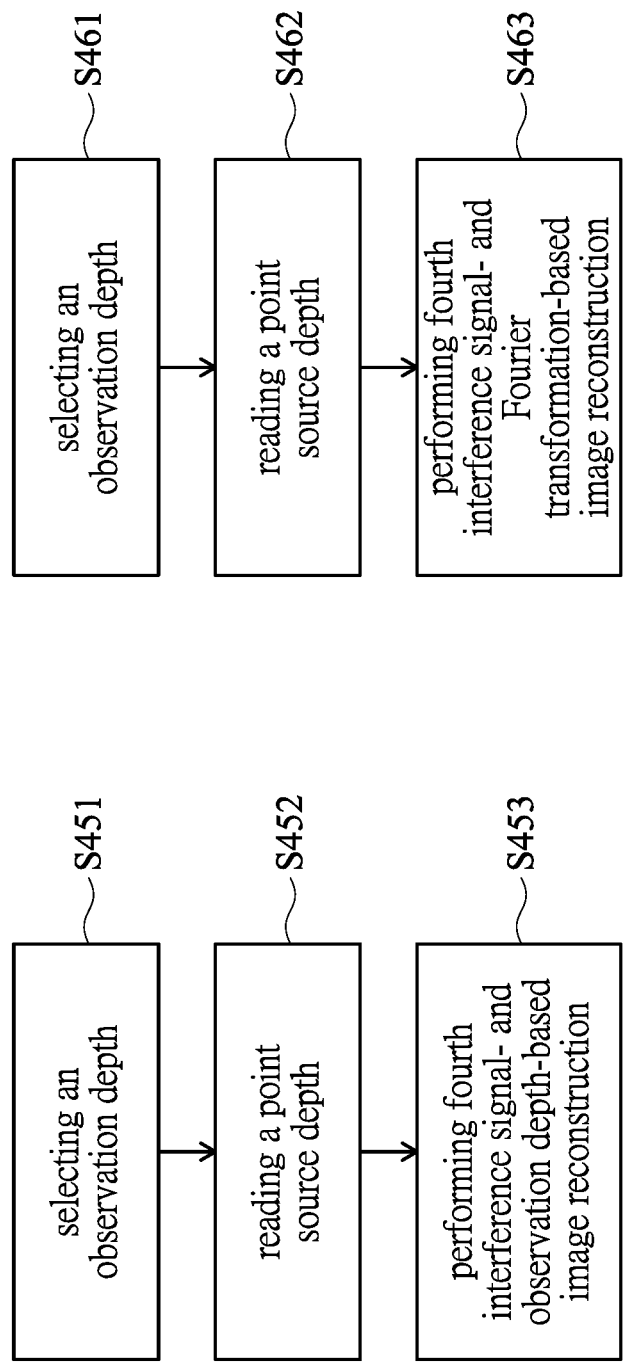
FIG. 9C shows the flowchart of the fourth observation-depth-based digital image reconstruction process of the fourth image reconstruction module.
FIG. 9D shows the flowchart of the fourth Fourier-transformation-based digital image reconstruction process of the fourth image reconstruction module.

When the third system reference light 414 is a spherical wave originating from a point source, referring to FIG. 9B and FIG. 9C, the lensless holographic imaging system 200 may further have a fourth image reconstruction module 450 for carrying out a fourth observation-depth-based digital image reconstruction process that includes the steps of: selecting an observation depth (step S451), reading a point source depth (step S452), and performing fourth interference-signal- and observation-depth-based image reconstruction (step S453).

In the first step S451 of selecting an observation depth, an observation depth is selected from a plurality of built-in observation depths, wherein each observation depth is the linear distance between the point source of a beam of third system reference light 414 and an inspection plane of an object 90 under inspection. The observation depth of the inspection plane corresponding to each beam of third system reference light 414 can be calculated in advance and recorded in the image reconstruction module.

In the second step S452 of reading a point source depth, the linear distance between the point source of the third system reference light 414 corresponding to the selected observation depth and the image capture device 140 is calculated and read as the point source depth.

In the third step S453 of performing fourth interference-signal- and observation-depth-based image reconstruction, the fourth interference signal 415 corresponding to the third system reference light 414 corresponding to the selected observation depth is converted into a fourth digital interference signal, which corresponds to a fourth electric field. The fourth electric field is then propagated to the read point source depth and is filtered at the read point source depth to remove the noise term while leaving the signal-term electric field. The signal-term electric field is sub sequently propagated to the selected observation depth to generate a reconstructed image corresponding to the selected observation depth.

Alternatively, referring to FIG. 9D, the fourth image reconstruction module 450 may carry out a fourth Fourier-transformation-based digital image reconstruction process whose first and second steps S461 and S462 are the same as the first and second steps S451 and S452 of the fourth observation-depth-based digital image reconstruction process, but whose third step S463 is different from the third step S453 and involves fourth interference-signal- and Fourier-transformation-based image reconstruction instead. More specifically, the fourth interference signal 415 corresponding to the third system reference light 414 corresponding to the selected observation depth is converted into a fourth digital interference signal, which corresponds to a fourth electric field. The fourth electric field is subjected to Fourier transformation and then filtered to remove the noise term while leaving the signal-term electric field. The signal-term electric field is sub sequently propagated to the selected observation depth to generate a reconstructed image corresponding to the selected observation depth.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A lensless holographic imaging system having a holographic optical element, comprising:
    a partially coherent light source for outputting a light beam;
    a light modulator which is a rotatable mirror for receiving the light beam and modulating the light beam into a plurality of reading lights and each one having a specific wavefront;
    a multiplexed holographic optical element irradiated with each one of the reading lights such that a portion of the each one of reading lights undergoes diffraction in the multiplexed holographic optical element and exits the multiplexed holographic optical element as a system reference light while another portion of the each one of reading lights exits the multiplexed holographic optical element through a first surface thereof as an object-irradiating light, the object-irradiating light being projected to and reflected by an inspection plane of an object under inspection to form an object-diffracted light, the object-diffracted light entering the multiplexed holographic optical element through the first surface thereof, passing through the multiplexed holographic optical element, and exiting the multiplexed holographic optical element through a second surface thereof; and
    an image capture device located at the second surface and configured to read interference signals generated by interference between the object-diffracted light and the beam of system reference light corresponding to each one of the reading lights;
    wherein the multiplexed holographic optical elements are set through a recording process irradiated with at least one recording light and at least one of the plurality of reading lights such that the multiplexed holographic optical elements record a plurality of interference patterns.

2. The lensless holographic imaging system of claim 1, wherein each said system reference light is a spherical wave originating from a point source, and the lensless holographic imaging system further comprises an image reconstruction module for performing an observation-depth-based digital image reconstruction process comprising the steps of:
    inputting an observation depth, wherein the observation depth is a linear distance between the point source of a system reference light and an inspection plane of a said object under inspection;
    reading a point source depth, wherein a linear distance between the point source of the system reference light corresponding to the input observation depth and the image capture device is calculated and read as the point source depth; and
    performing interference-signal- and observation-depth-based image reconstruction, wherein the interference signal corresponding to the system reference light corresponding to the input observation depth is converted into an digital interference signal, the digital interference signal corresponds to an electric field, the electric field is propagated to the read point source depth and is filtered at the read point source depth to remove a noise term while leaving a signal-term electric field, and the signal-term electric field is propagated to the input observation depth to generate a reconstructed image.

3. The lensless holographic imaging system of claim 1, wherein each said system reference light is a spherical wave originating from a point source, and the lensless holographic imaging system further comprises an image reconstruction module for performing an Fourier-transformation-based image reconstruction process comprising the steps of:
    inputting an observation depth, wherein the observation depth is a linear distance between the point source of a system reference light and an inspection plane of a said object under inspection;
    reading a point source depth, wherein a linear distance between the point source of the system reference light corresponding to the input observation depth and the image capture device is calculated and read as the point source depth; and
    performing interference-signal- and Fourier-transformation-based image reconstruction, wherein the interference signal corresponding to the system reference light corresponding to the input observation depth is converted into an digital interference signal, the digital interference signal corresponds to an electric field, the electric field is subjected to Fourier transformation and is filtered to remove a noise term while leaving a signal-term electric field, and the signal-term electric field is propagated to the input observation depth to generate a reconstructed image.

4. The lensless holographic imaging system of claim 1, wherein the partially coherent light source is a laser light source.

\* \* \* \* \*